United States Patent
Soufan et al.

(10) Patent No.: US 9,336,768 B2
(45) Date of Patent: *May 10, 2016

(54) SMARTPHONE SECURITY MASKING ENCLOSURE

(71) Applicant: CCD VENTURES LLC, New York, NY (US)

(72) Inventors: Ali H. Soufan, Tenalfy, NJ (US); Samuel Michael Romano, Valrico, FL (US); Jay Richard Eilenberg, Escondito, CA (US); Matt Haws, Indianapolis, IN (US); Mario P. Granados, Chula Vista, CA (US); Daniel Freedman, New York, NY (US); Anthony H. Handal, Westport, CT (US)

(73) Assignee: CCD VENTURES LLC, New York, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/952,556

(22) Filed: Jul. 26, 2013

(65) Prior Publication Data

US 2014/0161273 A1    Jun. 12, 2014

Related U.S. Application Data

(63) Continuation-in-part of application No. 12/929,721, filed on Feb. 11, 2011, now Pat. No. 8,699,235.

(60) Provisional application No. 61/338,184, filed on Feb. 17, 2010.

(51) Int. Cl.
| | |
|---|---|
| H04R 3/02 | (2006.01) |
| H05K 7/14 | (2006.01) |
| G10K 11/175 | (2006.01) |
| H04M 1/19 | (2006.01) |
| H04K 3/00 | (2006.01) |

(52) U.S. Cl.
CPC ............. G10K 11/175 (2013.01); H04K 3/43 (2013.01); H04K 3/68 (2013.01); H04K 3/825 (2013.01); H04M 1/19 (2013.01); *H04K 2203/12* (2013.01); *H04K 2203/16* (2013.01)

(58) Field of Classification Search
None
See application file for complete search history.

(56) References Cited

U.S. PATENT DOCUMENTS

| | | | | |
|---|---|---|---|---|
| 3,963,883 | A * | 6/1976 | Kulka | 379/453 |
| 8,116,461 | B2 * | 2/2012 | L'Esperance et al. | 381/56 |
| 8,203,850 | B2 * | 6/2012 | Bouza et al. | 361/800 |
| 8,699,235 | B2 * | 4/2014 | Soufan | 361/800 |
| 2010/0282997 | A1 * | 11/2010 | Tabarelli de Fatis | 252/62 |

* cited by examiner

*Primary Examiner* — Andrew L Sniezek
(74) *Attorney, Agent, or Firm* — Handal & Morofsky LLC

(57) ABSTRACT

The Mobile Phone/PDA Security Masking Enclosure is a sound insulated enclosure for use as a temporary storage location for cellular and other mobile devices in locations at which confidential and sensitive conversations and discussions are being conducted. A pink/white noise generating device within the enclosure generates a masking noise such that the cellular or other mobile devices inside the enclosure are unable to pick up or record conversations outside the enclosure.

21 Claims, 18 Drawing Sheets

SMARTPHONE SECURITY MASKING ENCLOSURE

CROSS REFERENCE TO RELATED APPLICATIONS

This application claims the benefit of patent application Ser. No. 12/929,721, filed Feb. 11, 2011, and provisional patent application 61/338,184, filed Feb. 17, 2010, both directed to a Mobile Phone/PDA Security Masking Box, the disclosures of which are hereby incorporated herein by reference thereto.

TECHNICAL FIELD

The present invention relates to acoustic security devices in general, and in particular to an enclosure for preventing unauthorized eavesdropping (or use of onboard device cameras) through the use of hacked cellular telephones, smartphones or other mobile wireless devices.

STATEMENT REGARDING FEDERALLY SPONSORED RESEARCH OR DEVELOPMENT (Not applicable)

BACKGROUND OF THE INVENTION

Senior executives and officials constantly strive to keep sensitive, confidential intellectual property and trade secrets protected. During personal conferences involving the discussion of sensitive matters, for example matters relating to strategic approaches, advertising, new products or the like, for example those typically held in offices and elsewhere, the confidentiality of communications, such as oral communications with others must be maintained. However, at the same time, staying in contact with one's coworkers is, more than ever, typically being done by cellular or mobile wireless devices. These individuals thus need to keep their devices connected to the network and be able to recognize and respond to certain calls and messages even when otherwise having sensitive and confidential discussions with others. However, such devices present a threat to security, whether through hacking not authorized by the owner of the device, or through surreptitious use of the device by its owner. More particularly, the technology exists today for the unauthorized conversion of another's smartphone or other handheld device into a "bug" enabling the hacker to listen in on a conversation being carried on in the proximity of the hacked device.

Typically, such hacking involves enabling the microphone in a smartphone and establishing a connection between the smartphone and a recording device being operated by the hacker. In this manner, the hacker can make a recording of the conversation available to, for example, competitors, hostile government officials, or other industrial, political or military espionage services.

Today more and more devices are capable of multiple functions and a growing number of devices are capable of being manipulated remotely by using the microphone in the device as a remote listening device. In addition to such conversion of the device's built-in microphone to allow room sounds to be picked up and transmitted to a remote location, the possibility also exists for the smartphone's built-in video camera to be converted to perform a military, political or industrial espionage function.

SUMMARY OF THE INVENTION

In one embodiment, the present invention is directed to an enclosure which produces a unique shaped and modified white or pink noise tailored to effectively mask voice conversations, to prevent the cellular or mobile wireless devices within it from picking up sounds from the surrounding area. The inventive mobile phone/PDA security sound masking enclosure provides a countermeasure against the vulnerability of subjecting confidential and private conversations to being picked up and recorded by cellular or mobile wireless devices, and yet allows for alerting of incoming calls and visual identification of caller ID to allow the conversation to be interrupted and the required phone call or message responded to. Several cellular or mobile wireless devices can be placed within the enclosure simultaneously as well as potentially vulnerable devices that have or may have electronics within such as watches, pens, recorders, thumb drives, etc.

Every box has an acoustic noise generator with a unique audio profile calculated to make filtering or neutralization of the jamming signal difficult or substantially impossible.

As normal human speech typically falls between 55 and 60 decibels, the enclosure will generate up to 90 decibels of unique noise within the enclosure. As the frequency of the human voice typically falls between 250 Hz and 3.5 KHz, the noise source within the enclosure will emit audio between frequencies of 200 Hz and 4 KHz, utilizing white or pink noise and other sounds, or combining white and pink noise to create an overlapping set of random signals and effectively mingling the white and pink noise sounds with all their frequencies and amplitudes in that bandwidth. The noise emitted will thus vary volume levels and output a non-recreatable blend of sounds that covers a large spectrum of frequencies and effectively masks the voices in the room. This active noise masking coupled with the passive reduction of voices in the room provided by the sealed enclosure, effectively drops the voice level and covers it with noise that is unintelligible and difficult to process to remove the noise and enhance the audio.

It is an object of the present invention to provide a new and improved security box for cellular or mobile wireless devices that will prevent such devices from picking up or recording conversations taking place outside of the box.

It is an object of the present invention to provide a new and improved security box for cellular or mobile wireless devices that will allow such devices to receive incoming calls while isolating them from local conversations and alert owners of the device that the device is being called.

It is an object of the present invention to provide a new and improved security box for cellular or mobile wireless devices to be easily accessed should the devices require attention while isolated.

These and other objects and advantages of the present invention will be fully apparent from the following description, when taken in connection with the annexed drawings.

BRIEF DESCRIPTION OF THE DRAWINGS

The operation of the inventive noise masking box will become apparent from the following description taken in conjunction with the drawings, in which.

DETAILED DESCRIPTION OF THE PREFERRED EMBODIMENTS

The preferred embodiment herein described is not intended to be exhaustive or to limit the invention to the precise form disclosed. It is chosen and described to best explain the invention so that others, skilled in the art to which the invention pertains, might utilize its teachings.

Figure 1:
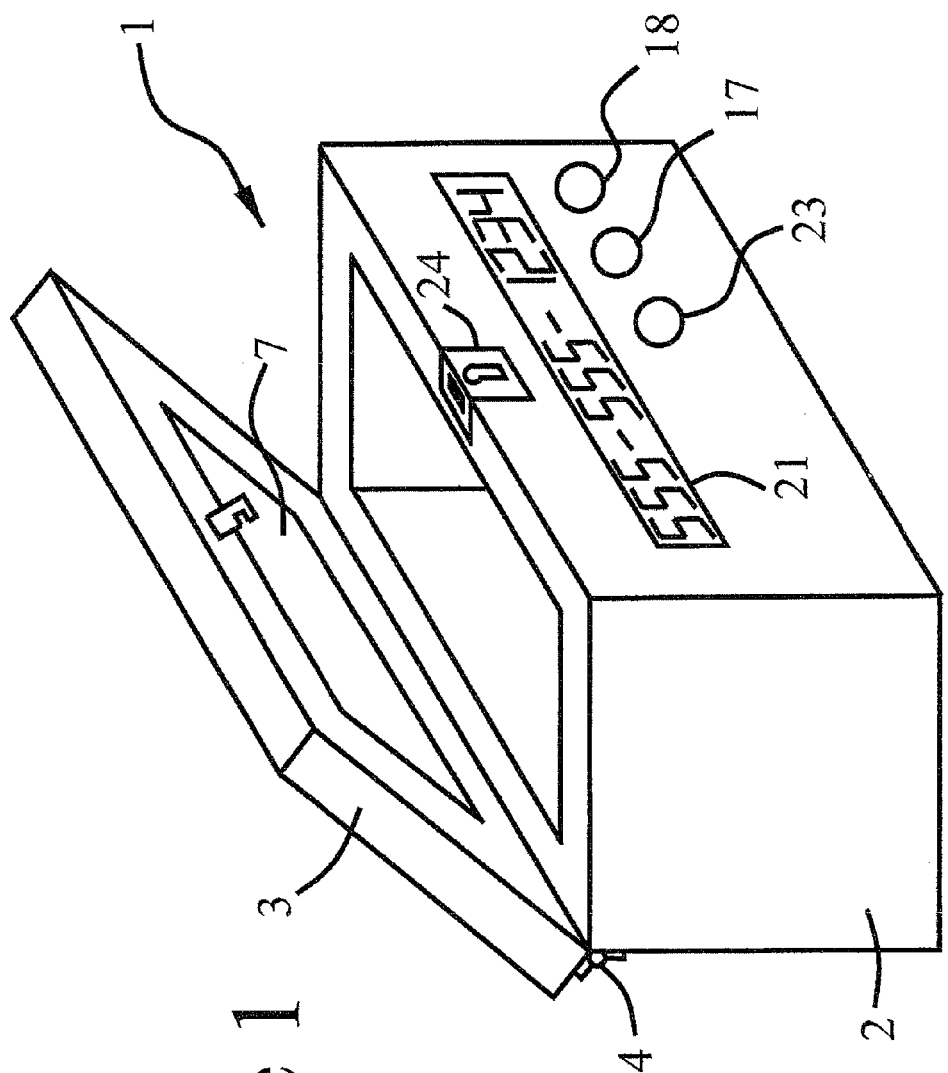
FIG. 1 is an overall view of one embodiment of the enclosure of the present invention.
Figure 2:
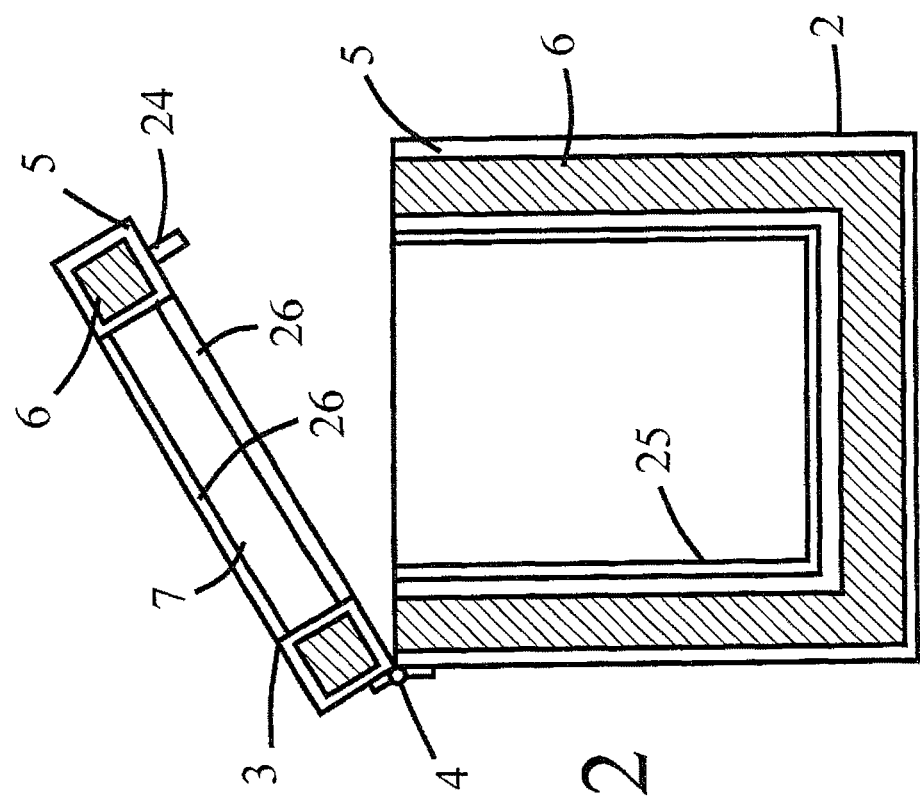
FIG. 2 is a sectional view of the box wall illustrating its hollow interior and insulated walls.

Referring to FIG. 1, one embodiment of the inventive security masking enclosure 1 comprises a box 2 with a cover 3. The cover 3 is preferably connected to the box 2 by a hinge 4. Alternatively, the cover 3 may be a separate piece that fits onto box 2. As seen in FIG. 2, box 2 has a double wall 5 construction with sound absorbing materials 6 arranged between walls 5. The sound absorbing materials 6 arranged between the walls 5 may be comprised of a foam material or an alternative and equally effective sound dampening material or the wall may be made from a solid sound isolation material without the insulation between the walls. Cover 3 uses the same double wall 5 construction with sound absorbing materials 6 as box 2. The interior surfaces of box 2 may be covered with a sound absorbing material such as felt 25 or a combination of materials that further reduce sound transmission from the outside to the inside of the box and vice versa. Felt 25 will also provide a soft surface to protect the surfaces of devices, such as smartphone 8 placed within the box 2.

The exterior of the box 2 may be made from any substantially rigid material or combination of substantially rigid materials, including but not limited to solid wood, metal, medium-density fiber board, and/or volcanic ash composite (comprising, for example, fiberglass, wood fibers, banana peel fibers, mango leaf/tree fibers, and volcanic ash). Generally, weight, rigidity and sound dampening are important characteristics of the components of the inventive enclosure.

The aim of the inventive construction is to create a container which is substantially airtight when covered, and to provide at least 40 decibels of sound isolation, together with effective audio jamming of incidentals audio signals entering the inventive enclosure. In accordance with the invention, it is contemplated that box 2 acts in tandem with the sound-deadening internal lining material in order to acoustically isolate any electronic devices housed within box 2 and isolate any and all sounds within box 2.

Optionally, as shown in FIG. 1, cover 3 is provided with a window 7 to allow cellular or mobile wireless devices 8 to be viewed inside the box for visual observation of any incoming calls and caller identification information. Window 7 has at least two separated layers of transparent material 26 to increase the sound isolating ability of window 7. However, it is preferred that the inventive enclosure not incorporate a transparent window, or that window size be reduced, insofar as such windows are less effective in blocking the transmission of sound, as compared to the double wall construction of the remaining portion of the box with its intermediate layer of sound blocking material. However, in the event that some visual indicator of the content of the inventive enclosure is desired, minimization of the transmission of sounds through windows may be achieved by providing small windows directly above the centers of the smartphone compartments or nests contained within the box, thus minimizing the area of the windows and the resulting transmission of sound. The window could be single pane glass as long as it provides at least 40 db of sound loss from the outside to inside of the enclosure. The window may also be reduced in size to minimize sound transmission.

For added security, box 2 and cover 3 may be provided with a lockable latch 24 to prevent smartphone devices 8 within the box 2 from being surreptitiously removed. The latch 24 may be key or combination operated.

Figure 3:
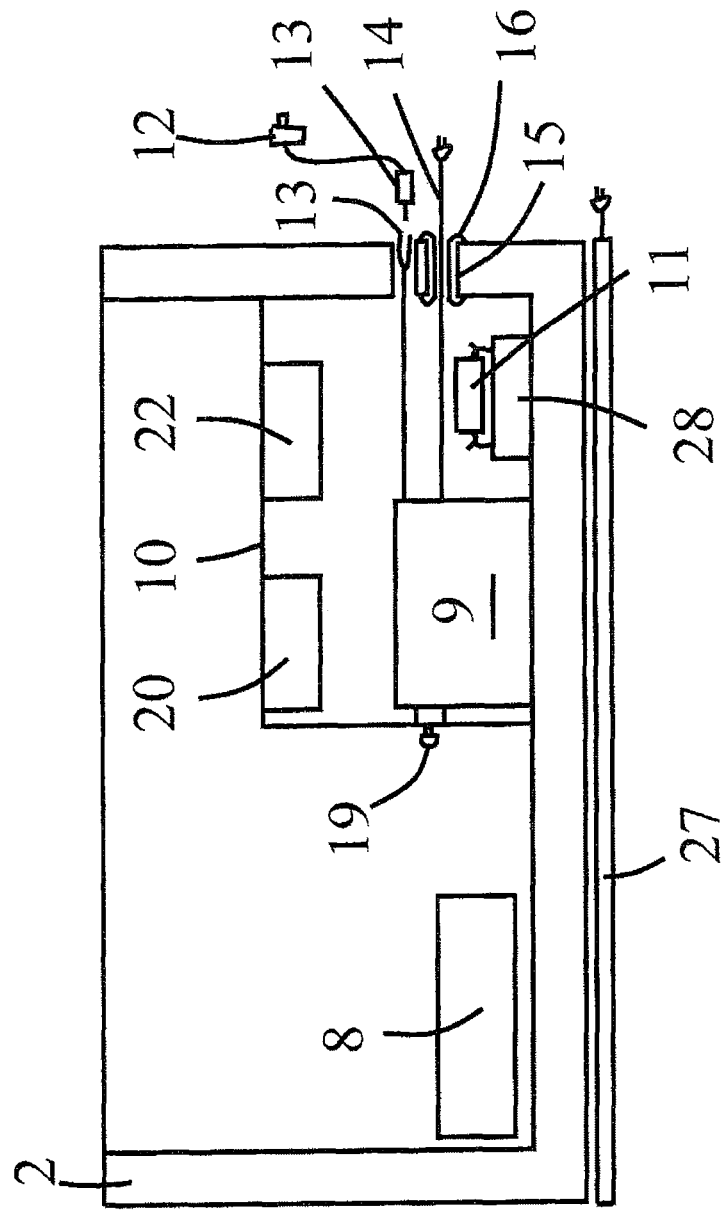
FIG. 3 is an interior view of the embodiment of the present invention illustrated in FIGS. 1 and 2.

FIG. 3 shows the interior of box 2. Acoustical noise masking circuitry 9 is placed beneath an interior shelf 10 in box 2. Acoustical noise masking circuitry 9 is electrically powered by either one or more batteries 11, or an outside electrical power source 12 such as an A/C adapter. The outside electrical power source 12 may be connected to box 2 by a plug 13 or it may be permanently attached with the cord 14 routed through an opening 15 in the box. The opening 15 is provided with a grommet 16 made of rubber or other material to prevent sounds from entering the box 2. The one or more batteries 11 may be rechargeable by an outside electrical power source 12 through the plug 13.

Alternatively, the one or more batteries 11 may be recharged by a power mat 27 instead of an outside electrical power source 12. Power mat 27 uses magnetic induction to transfer electricity to receiver circuitry 28 to recharge the one or more batteries 11. This allows for the manufacture of a box 2 without penetration of the box for a plug 13 thus enhancing appearance and allowing more portability of the security masking box 1 within the room or area without regard to a power outlet. Either during use or afterwards the security masking box 1 could be placed on top of the power mat 27 for recharging of the one or more batteries 11.

The acoustical noise masking circuitry 9 generates various acoustic power levels of pseudo random or truly random pink and/or white noise. The acoustical noise generating circuitry 9 is optimized for voice range noise masking to prevent cellular or mobile wireless devices 8, or other listening devices, from picking up conversations, and is designed to reduce the effectiveness of eavesdropping devices such as microphones and associated recorders.

The optimal noise generating circuitry will provide the masking noise in the audio frequency range of 250 Hz to 3.5 KHz and will generate, if necessary, up to 90 dB of noise at a distance of 4 feet. A control 17 is provided inside or outside the box to adjust the volume of the masking noise. Pink and white noise at the correct levels of intensity have been proven to mask conversations when provided in the same sound range as that of human speech and a key to the invention is to keep these noise sources as random as possible. Inside box 2, the noise generated is at such a level that any conversations from outside box 2 are sufficiently masked to render them unintelligible at the microphones of the cellular or mobile wireless devices 8 inside box 2, or the levels are of such an intensity that the microphones typically used in cellular or mobile wireless devices 8 are driven into saturation with the pink and white noise.

In another embodiment, as shown in FIGS. 1 and 3, box 2 is provided with an OLED (organic light emitting diode) caller ID module 20. Caller ID module 20 uses Bluetooth™ or other wireless protocol for exchanging data to connect to the externally mounted OLED indicator 21. Other types of alphanumeric readouts may also be used.

In another embodiment, as shown in FIGS. 1 and 3, one or more RF sensors 22 is mounted inside the enclosure 2 and connected to an outside indicator 23 that visually and/or audibly indicates whether a cellular or mobile wireless device 8 in the enclosure 2 is transmitting an RF signal within the frequency range of the RF sensors 22.

Figure 4:
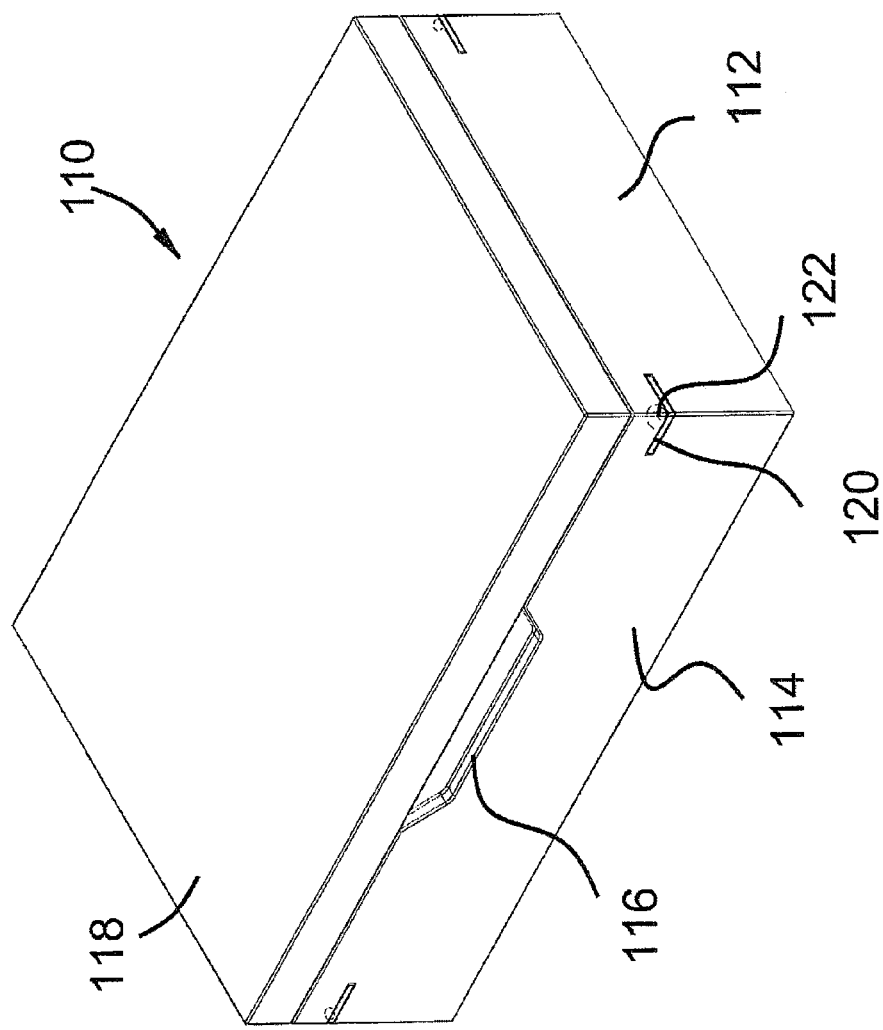
FIG. 4 is a perspective view of an alternative embodiment of the present invention.

In an alternative embodiment, as shown in FIG. 4, enclosure 110 is comprised of three sidewalls 112 and a front sidewall 114. Front sidewall 114 includes a recessed notch 116 in a cover 118. Notch 116 allows a user to grasp cover 118 with his hand by inserting his thumb into notch 116 to engage a portion of the bottom side of cover 118 and lift cover 118.

In accordance with this embodiment of the invention, four corner lenses 120 are provided in each of the four corners of enclosure 110 to provide for the observation of light emitted by incoming call notification signal lights, for example light emitting diodes 122. The four corner inserts 120 are made of a clear acrylic material and transmit light emitted by light emitting diodes 122.

Because light from diodes 122 is externally visible through lenses 120 users will be able to see that a call is coming in on one of the phones. In one embodiment of this invention the position of the light is correlated to the position of the smartphone receiving an incoming call, i.e., the phone which is receiving the call. Thus, each of the lights is assigned to a specific smart phone, and thus users are aware of which of a number of smartphones in enclosure 110 is receiving that call. As noted above, notification may also extend to the inclusion of a separate display (not illustrated in the subject figure) of the caller ID information respecting the incoming call. Alternatively, security may dictate that no such notification be provided, or just a visual that one of the phones is being called with no indications of which one. The user can then look through the glass and see which phone is ringing and who is calling.

Figure 5:
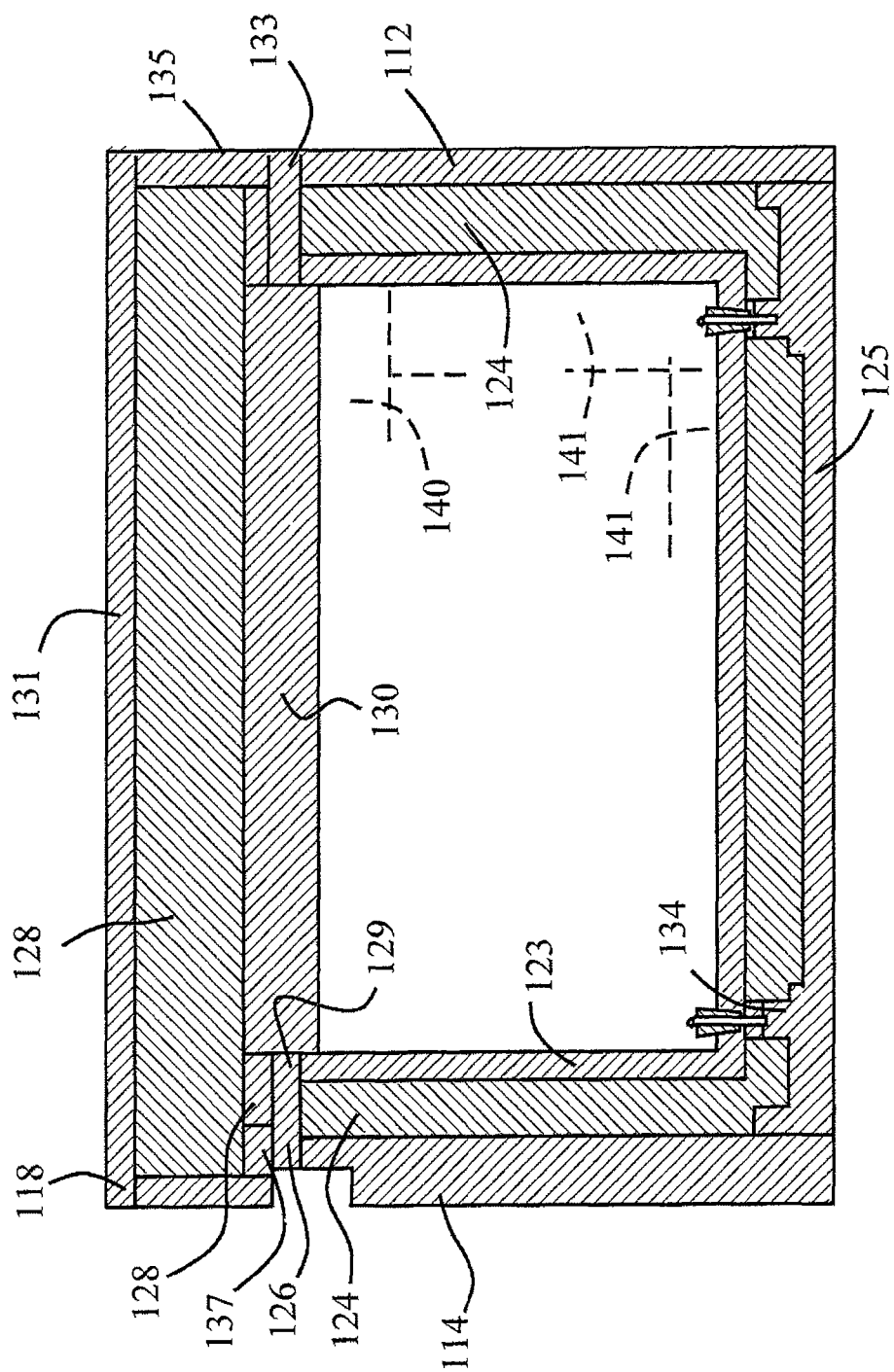
FIG. 5 is a cross-sectional view of the embodiment of FIG. 4 of the invention illustrated in FIG. 4 illustrating its hollow interior, insulated walls, and the sound insulating materials between the walls of the embodiment of FIG. 4 and the cover of the embodiment of FIG. 4 when the box is closed and sealed.

Sidewalls 112, 114 of enclosure 110, as shown in FIG. 5, form a container which houses an internal box 123. Box 123 may be of any suitable construction, for example, it may be a single piece of injection molded plastic. Alternatively, it may comprise assembled wooden sidewalls and bottom. Alternatively, box 123 may be made of a rubbery plastic which may be selected for its sound deadening and aesthetic properties. Such one-piece molded box may be molded to include a plurality of compartments or nests on its bottom, as more fully appears below.

The space between sidewalls 112, 114 and internal box 123 is filled with a layer of sound dampening material, such as a sound absorbing foam 124 or other suitable material. Likewise, sound absorbing material is positioned between the bottom of box 123 and a bottom member 125 which closes enclosure 110 on the bottom.

Sidewalls 112, 114 and bottom 125 may be made of any suitable material chosen for its mechanical properties, appearance, and so forth. Sidewalls 112, 114 and bottom 125 are secured to each other to form the outside box, for example using glue or other suitable joining technique.

The purpose of the sound deadening material 124 is both to deaden sound vibrations that would otherwise pass from the interior of enclosure 110 to the exterior through sidewalls 112, 114 and other parts of enclosure 110, as well as to deaden sound vibrations associated with conversations in the proximity of the inventive enclosure 110, as noted above, that would otherwise pass from the exterior of enclosure 110 to the interior frame where it could be picked up by a microphone in a hacking-vulnerable smartphone) through sidewalls 112, 114 and other parts of enclosure 110.

Enclosure 110, as alluded to above, further includes a cover 118, which serves as an airtight closure for enclosure 110. Cover 118 accordingly makes enclosure 110 substantially airtight, thus not providing any holes or gaps for the transmission of sound to or from the interior of enclosure 110.

Cover 118 is also of double wall construction and contains the same or a similar layer of sound dampening foam or equivalent material 127 to prevent vibrations from passing through cover 118. Sound dampening foam 127 is supported by a sheet of material, such as stiff rubber member 130 on the underside of cover 118. Stiff rubber member 130 further prevents the transfer of vibrations and seals the interior of enclosure 110. Stiff rubber member 130 mates with a gasket 126. Gasket 126, which may be made of the same rubbery material as box 123, may be glued to the top surfaces of box 123 and sidewalls 112, 114, to complete the lower portion of enclosure 110 and to house sound deadening material 124, which prevents it from being exposed to the outside environment.

The top surface of gasket 126 meets the bottom-facing surface 129 of cover 118, and thus interfaces with a thin layer of soft rubbery material in the form of rubber gasket 126. Gasket 126 serves as a gasket to seal enclosure 110 and minimize any vibration of cover 118 against the optionally more rigid bottom-surface of cover 118. The underside of cover 118 is where soft rubber gasket 126 meets cover 118. The cover's interior foam sound deadening barrier 127 is positioned between the top 131 of cover 118 and the bottom surface of cover 118.

The bottom surface of cover 118 is formed by the bottom edge 133 of cover sidewalls 135, cover lip member 137, a thin layer of sound blocking material such as foam 128 and stiff rubber member 130, all of which are secured to each other and to sound deadening member 127 by glue.

The resulting structure allows cover 118 to close and seal atop sidewalls 112, 114 without the direct rigid member contact between the outer members which form enclosure 118, such as sidewalls 112, 114 and inner box 123, and without indirect contact through any other rigid elements of enclosure 110. More particularly, member 126 may be made of foam or a soft rubbery material which will not transmit sound in any significant way. Likewise, member 128 may be made of a similar material thus ensuring that while the rubber member 130 is supported, there is no significant vibration/sound carrying channel for sounds to move either into or out from enclosure 110. In this way, the passing of vibrations through a contact point of any two rigid surfaces is substantially prevented.

Also visible in the sectional view provided by FIG. 5 are screw supports built on support screw receiving supports 134 by which box 123 is fastened to base assembly 132 of enclosure 110 in a manner which substantially prevents direct transmission of vibrations from the outside of the enclosure to box 123, as is more fully explained below.

The external parts of the inventive enclosure 110 may be made of any suitable material, such as medium density fiber board (an engineered wood product formed by breaking down hardwood or softwood residuals into wood fibers, often in a defibrator, combining it with wax and a resin binder, and forming panels by applying high temperature and pressure. Medium density fiberboard is a particularly desirable material, in so far as it is strong, stiff and substantially uniform and characteristic both visually and mechanically. Generally, external parts having greater mass, rigidity and a sound deadening characteristic are preferred.

Another particularly advantageous material for the external components of the inventive enclosure 110 is volcanic ash composite wood material, a wood based composite material with resin and epoxy as the binding agent. It is made with other additives to make the material stiffer, denser and have unique and advantageous properties for blocking sound transmission. The exact percentage of the various constituent materials in this composite varies, but in general material comprises fiberglass, wood fibers, banana peel fibers, mango leaf and tree fibers and volcanic ash. Manufacturers of this material tout the combination of materials and their characteristics as being optimized for such applications as loudspeaker housings, but the general idea of mixing materials in with typical MDF compositions to produce "sound deadening" properties is not limited to this volcanic ash composite materials.

Still other possibilities for external components are exotic hardwoods (selected for their attractiveness), marine plywood, softwood plywood, hardwood plywood, and tropical plywood. These members may also be made from a wide range of plastics, including fiber (for example glass and/or graphite fibers) reinforced plastics, and potentially other composite materials.

Likewise, there is a range of sound deadening materials which may be employed advantageously in accordance with the present invention. Many commercial products are available which come in sheets, typically ranging between one and 4 cm in thickness. These materials may be employed as sound deadening materials 124 and 127. In addition, certain specialized materials having an attractive finish may be used to line the insides of enclosure 110 with a sound deadening liner 140, 141, as illustrated in phantom lines in FIG. 5.

Such materials may include Eco Core, manufactured by Sonex; Fiberglas 700 series insulation manufactured by Owens Corning; and Cascade Audio Engineering acoustic cotton. Spray foam materials may also be employed.

Generally, the objective of the invention is to ensure that sound isolation from inside the enclosure to outside is greater than 40 dB. In, "Characterization of Sound Transmission Loss of Laminated Glass with Analytical and Experimental Approaches", by Xin Sun, Kevin Simmons and Moe Khaleel it is shown that glass transmission is around 30-45 dB depending on the frequency. This needs to be taken into account in design of a box with a glass cover, as more fully described below. So the combination of wall material, construction, sound absorption material, top to bottom sealing of the cabinet and glass, means that we have a system that has to isolate the sound transmission from inside to outside the box. We will call this amount of sound transmission, $ST_{box}$ (it is typically a negative number but we will use it as a positive number for this analysis).

Since the goal of the invention is to prevent the device inside the box from hearing sounds inside the room and is aimed at mostly conversation we know that typical in room conversations that are not amplified are of 70 dB, a raised voice to 76 dB, a very loud voice to 82 dB and a shouting voice to 88 dB (1 ft distance).

For every doubling of the distance from the noise source the sound pressure levels will be reduced by 6 decibels. This may be expressed like:

| Distance | | Voice Level (dB) | | | |
|---|---|---|---|---|---|
| (feet) | (m) | Normal | Raised | Very Loud | Shouting |
| 1 | 0.3 | 70 | 76 | 82 | 88 |
| 3 | 0.9 | 60 | 66 | 72 | 78 |
| 6 | 1.8 | 54 | 60 | 66 | 72 |
| 12 | 3.7 | 48 | 54 | 60 | 66 |
| 24 | 7.3 | 42 | 48 | 54 | 60 |

In social situations people often talk with normal voice levels at distances of 1 to 4 meters. In such cases the noise level should not exceed 55 to 60 dB(A).

Thus, assuming the worst case and adding in 6 dB, this doubles this to 94 dB. We can call this $SL_{room}$.

So the sound level inside the box, $SL_{box}$, can be expressed by $SL_{box}=SL_{room}-ST_{box}$, For this discussion we are ignoring the frequency of the sound and using the maximum SL in the room and the minimum ST of the box. This is just to simplify this equation.

A microphone on a device has a sensitivity and below a certain threshold the mic cannot pickup sounds. Since there are many advances in amplification and sound processing and it may be uncertain, depending upon the nature of the sound, how much sound can be re-processed to be intelligible, we will say that we need to achieve a SL of the speaker inside the box at the furthest point of that devices microphone from the speaker. Since the box is typically smaller than 2 feet we can assume that the furthest device will receive a signal from the speaker that is 6 db down from the speaker specified or measured in free air at 1 foot.

Therefore, the speaker's minimum output level should be $SL_{speaker}$=Speaker spec at 1 foot+6 dB at 1 W input from amplifier.

If $SL_{room}$=94 dB and $ST_{box}$=30 dB, then the $SL_{speaker}$ should equal a minimum of 70 dB. So the equation is $SL_{room}-ST_{box}+6=SL_{speaker}$.

The more you increase the sound transmission loss of the enclosure the less speaker power you need. Thus, the combination of active noise reduction from the speaker is directly related to the amount of transmission the box can isolate.

Since voice sounds are in the range of 250 Hz-3.5 KHz we will use a noise source that is bandwidth limited to the 200 Hz-4 KHz range to make sure we effectively cover this. Effective noise masking can be achieved by combining a pink noise and a white noise source to create an overlapping set of random signals and thus effectively mask all frequencies in the desired band width. We believe that varying the volume level of pink and white noise sources and mixing them together will more effectively mask the noise.

The volume variation of the two signals insures that there are random noises and varying levels that will aid in protecting any voice levels inside the box to be effectively masked for sound processing applications as these types of processors are becoming more sophisticated. So the noise source has a frequency dependent level variation imposed on the origin. Lastly, on the noise source, one can, in accordance with the invention, mix in a waterfall and rain drops on a tin roof noise sources (or other sources) to insure that the noise covers a large spectrum. The exact nature of this mixing and the percentages of the different or types of sources is not the most important piece, it is effectively creating a non-recreatable noise that effective prevents sound processing from determining a pattern and way to filter out the noise.

Another embodiment of the invention could be a manufacturing process that generates a unique noise source created from multiple sources and processing to better insure "hackers" could not recreate the sound signal as each unit produced will have a unique noise source. In accordance with a preferred embodiment, the electronics are designed in such a way that the electronics create a unique noise source each time the unit is turned on, so that at no time is the noise source the same in the same box. The more unique the noise source the more difficult it is for "hackers" to filter out the noise source and process the voices into an intelligible recording. Alternatively, the algorithm generating the noise may be periodically changed, optionally dependent on a true random signal such as the noise generated by a semiconductor junction.

Pink noise or 1/f noise (sometimes also called flicker noise) is a signal or process with a frequency spectrum such that the power spectral density (energy or power per Hz) is inversely proportional to the frequency. In pink noise, each octave carries an equal amount of noise power.

In signal processing, white noise is a random signal with a flat (constant) power spectral density. In other words, a signal that contains equal power within any frequency band with a fixed width. The term is used, with this or similar meanings, in many scientific and technical disciplines, including physics, acoustic engineering, telecommunications, statistical forecasting, and many more. Rigorously speaking, "white noise" refers to a statistical model for signals and signal sources, rather than to any specific signal, and such random signals may be generated using a pseudorandom noise generator or using an actual noise source, such as a properly biased semiconductor junction.

Figure 6:
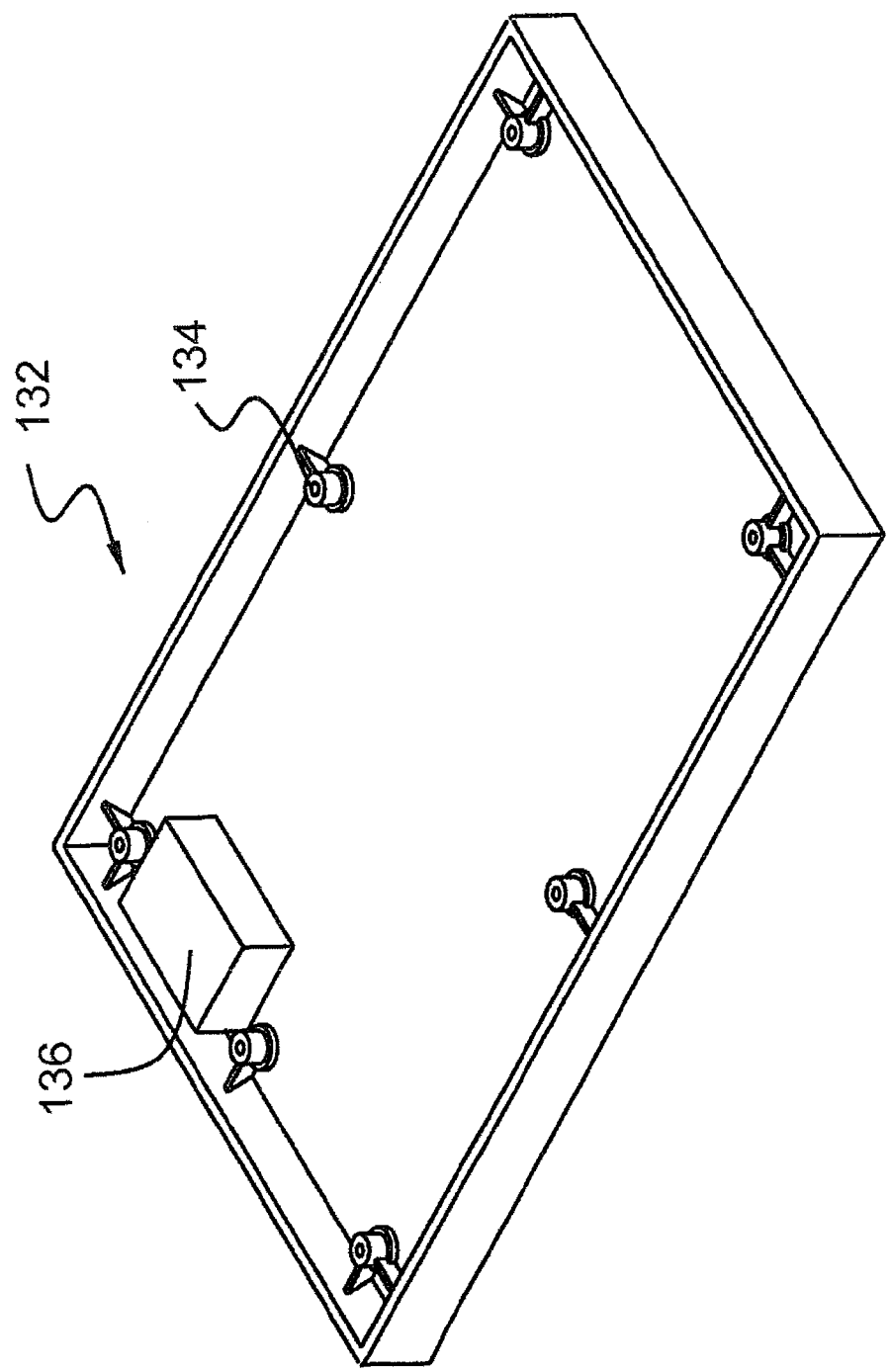
FIG. 6 is a perspective of the base of the embodiment of FIG. 4.

Referring to FIG. 6, base assembly 132 may comprise seven screw assembly 132. A compartment 136 is included in injection-molded base assembly 132 for the housing of a 9-volt battery power supply used to power the device.

Figure 7:
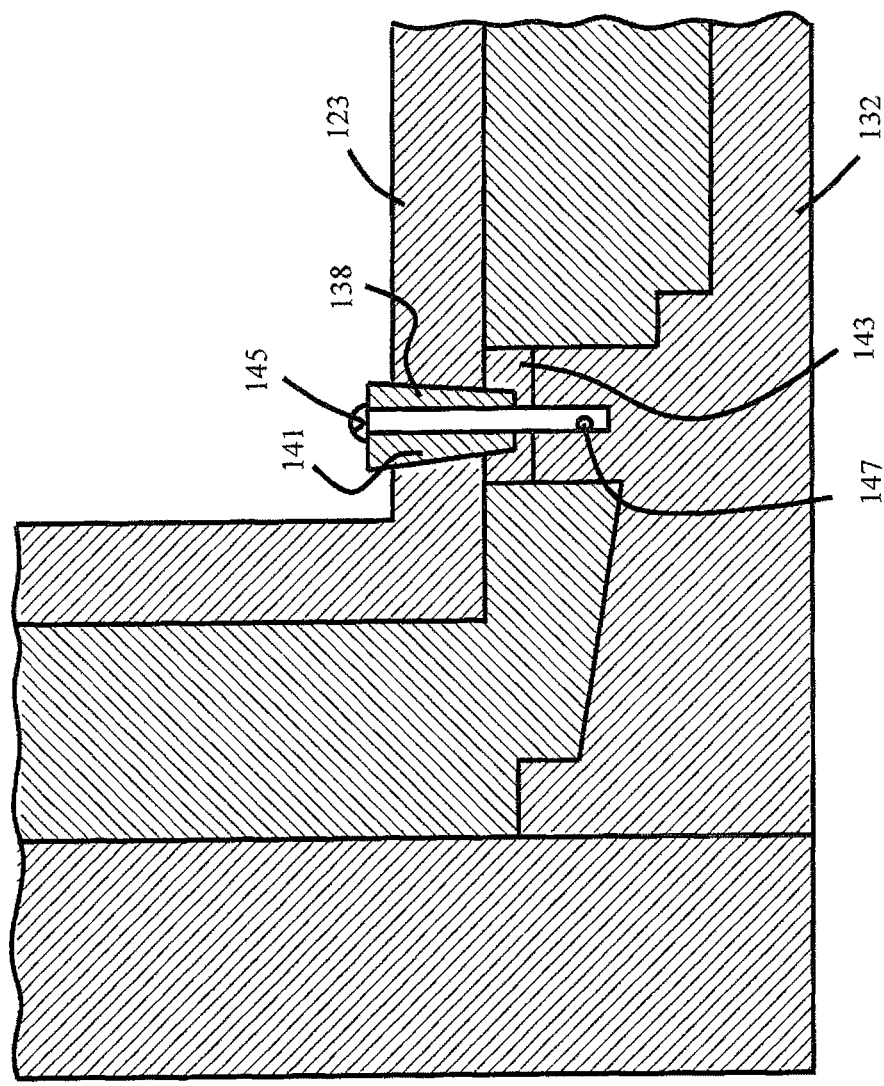
FIG. 7 is a cross-sectional detail view of the sound insulating screw mounting for the base of the embodiment of FIG. 4.

Screw housings 134, as shown in FIG. 7, allow tray 140 to be secured to base assembly 132. A soft fiber cork 138 fits in screw hole 141 of the screw housing and blocks the passing of vibrations through from base assembly 132 to interior box 123 and from the hollow interior to the base assembly 132 and then to the environment exterior to enclosure 110. Sound is also blocked by fiber sound blocking washer 143. Screw 145 is secured into a tapped hole 147 in screw receiving members 134. While a negligible amount of sound vibration will be communicated into the inside of enclosure 110 by the head of screw 145, the small surface area of the screw head makes this a negligible issue. More importantly, the sound blocking support comprising blocking washer 143 and fiber cork 138 insures that substantially no vibrations will be transmitted from base assembly 132 to interior box 123.

Figure 8:
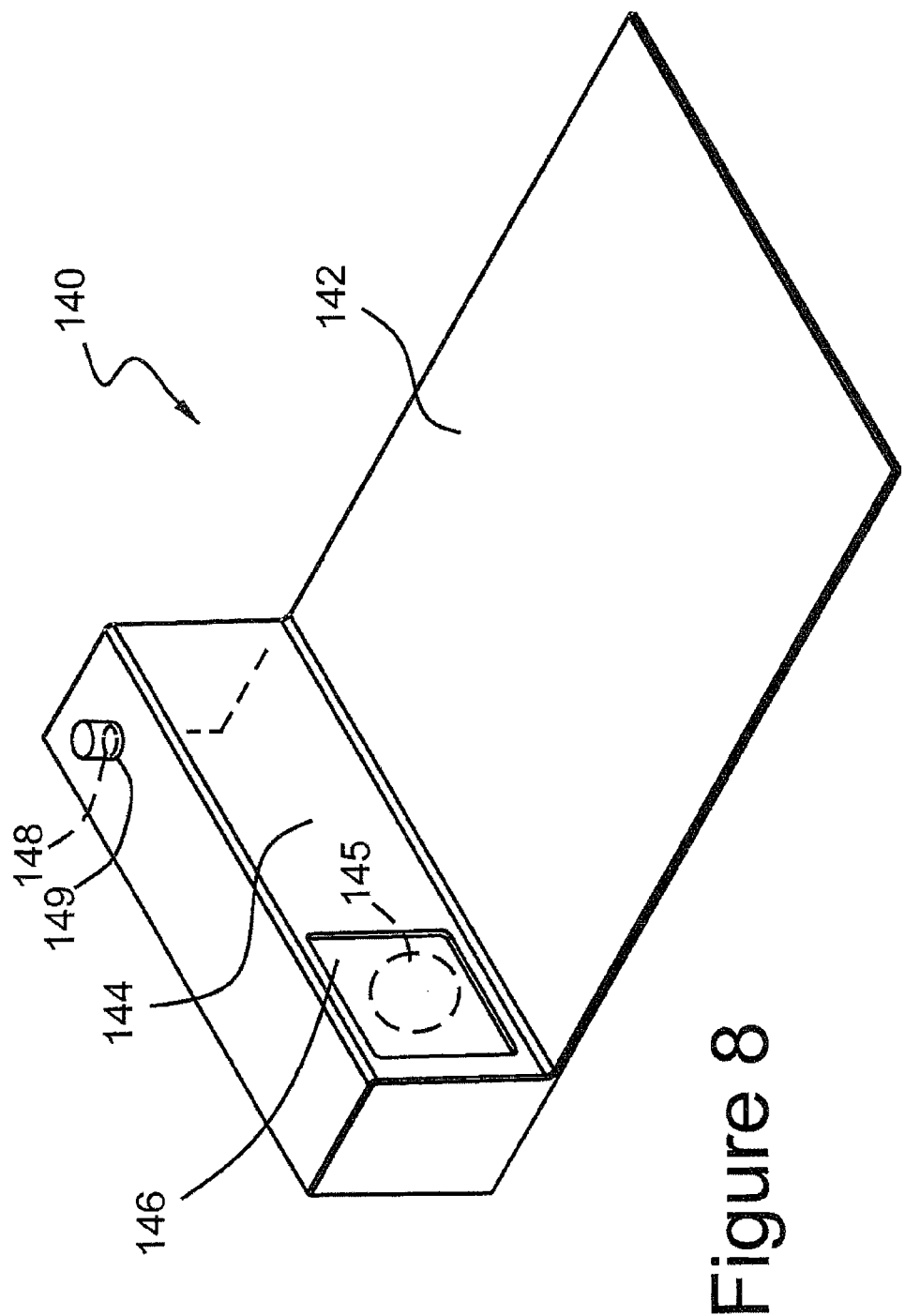
FIG. 8 is a perspective of the speaker-housing tray of the embodiment of FIG. 4.

Optionally, a tray 140, as shown in FIG. 8, may be employed. Tray 140 sits atop and is secured to inner box 123 in accordance with this alternative. Tray 140 comprises a flat base surface 142 and a raised compartment 144. Raised compartment 144 features a speaker 145 behind an access hole 146 behind which speaker 145 is mounted. Speaker 145 emits noise-masking white and/or pink noise into the interior of enclosure 110. The top surface of compartment 144 includes a hole which serves as the mounting location 148 for a rotary knob 149 that controls the power and/or volume of noise-emitting speaker 145 housed behind speaker access hole 146.

Figure 9:
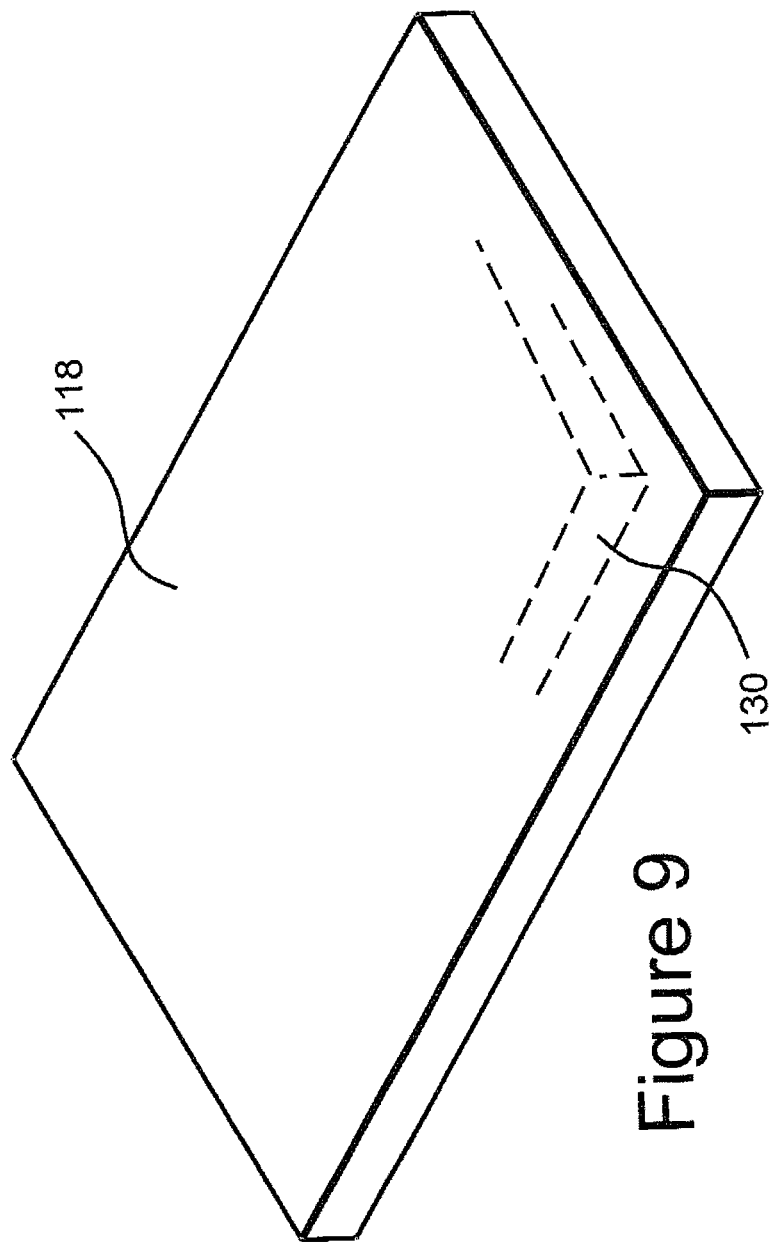
FIG. 9 is a perspective of the cover of the embodiment of FIG. 4.

Cover 118 is a separate member which may be simply placed on top of the bottom of enclosure 110, as shown in FIG. 9. It sits atop enclosure 110, being kept in place by rubber member 130 and seals the interior and contents of enclosure 110 when placed atop enclosure 110. It may be but is not necessarily constructed of the same material as enclosure 110. It contains the same sound dampening foam interior as sidewalls 112, 114 of enclosure 110, as discussed above.

Figure 10:
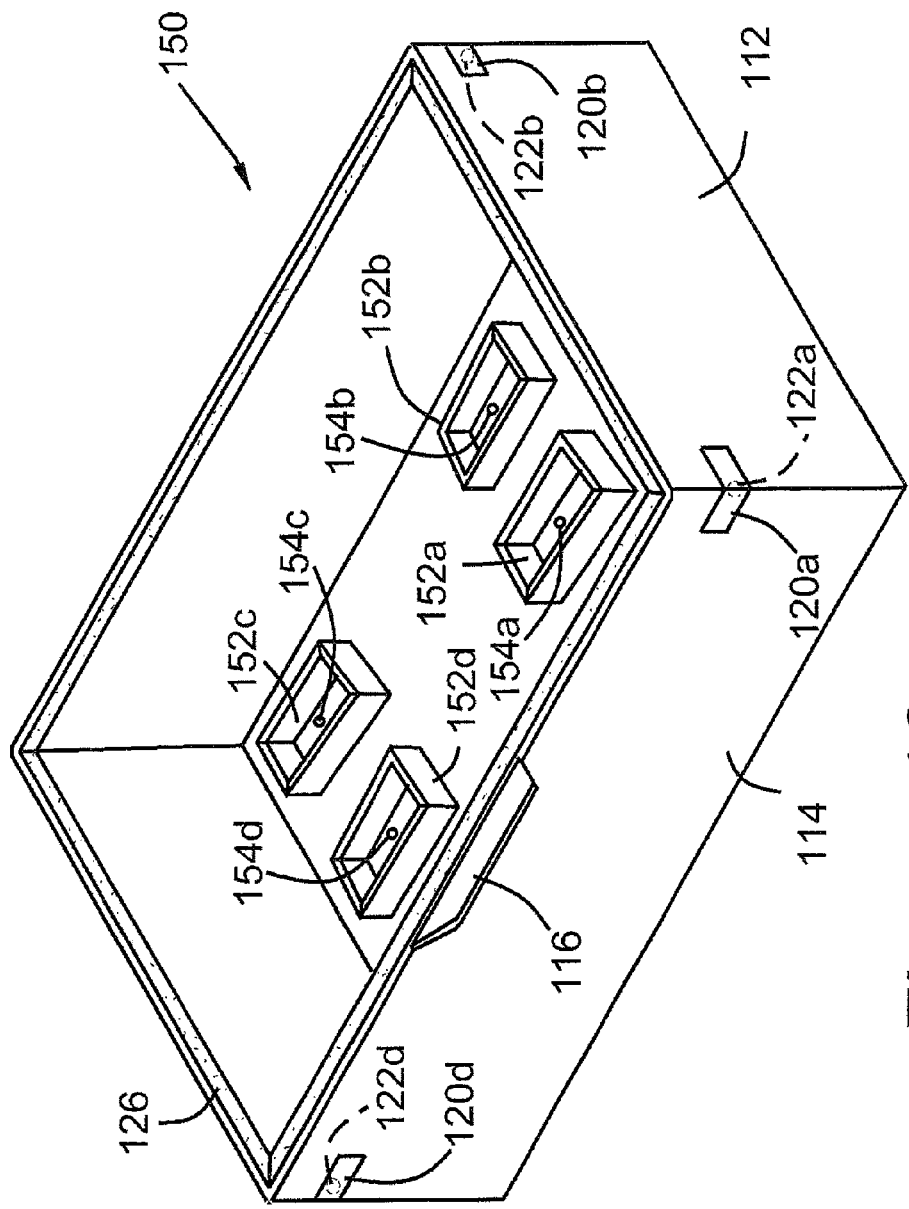
FIG. 10 is a perspective of the four-walled exterior of the embodiment of FIG. 4, with cover removed.

Uncovered bottom portion 150 of enclosure 110, as shown in FIG. 10, includes a recessed notch 116, as discussed above. Soft rubber gasket 126 is visible along the top edge of sidewalls 112, 114, the gasket preventing vibration of cover 118 against sidewalls 112, 114 when enclosure 110 is covered, while also providing a sealed interface without any gaps which might transmit sound in one direction or the other.

As discussed above, the transmission of sound from outside the box into the box must be effectively blocked, to prevent conversations from being transmitted to a hacker for recording or other use. Likewise, as noted above, a white noise and/or pink noise and/or another noise source is used to block the reception of any audio which might enter the box with an amplitude strong enough to be detected by a microphone of a hacked smartphone. In accordance with the invention, it is desirable that this white noise and/or pink noise or other noise source not be heard outside the box. Hence the sound deadening and sound blocking characteristics of the box are important in both directions.

Inside of uncovered base portion 150 of enclosure 110, one can include, optionally, four (or any number) of upward-facing, hollowed out, and rubberized, felt covered or other suitably covered rectangular nests or cradles 152, arranged in a 2×2 configuration such that each cradle 152 is closest to one unique corner of enclosure 110. At the center of the recession in each rubberized rectangular cradle 152 is housed a circular microphone hole 154, the purpose of said microphone 154 being to detect ringing and/or vibration of mobile or wireless devices 8 placed inside cradles 152. Each cradle 152 corresponds to one corner lens 120 a-d, the purpose of the corner lens 120 a-d being to emit a light signal through activation of an LED 122 a-d positioned behind each corner lens 120 a-d. When a microphone 154 detects ringing and/or vibration of its respective mobile or wireless device 8, its respective LED 120 a-d is activated.

Figure 11:
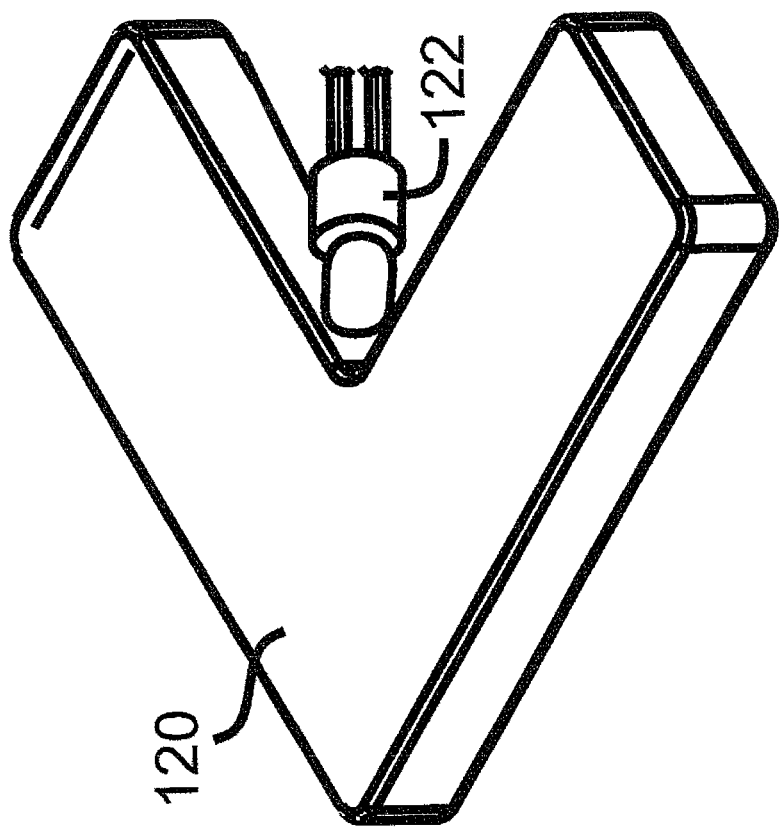
FIG. 11 is a perspective of the corner lens light indicators of the embodiment of FIG. 4.

Corner lenses 120 a-d, as shown in FIG. 11, are inlaid into the corners of sidewalls 112, 114 and each cover their respective internally-housed LED bulb 122 a-d. Corner lenses 120 a-d are made of a clear acrylic material and transmit the emitted light output from LEDs 122 a-d, as appears more fully below.

Figure 12:
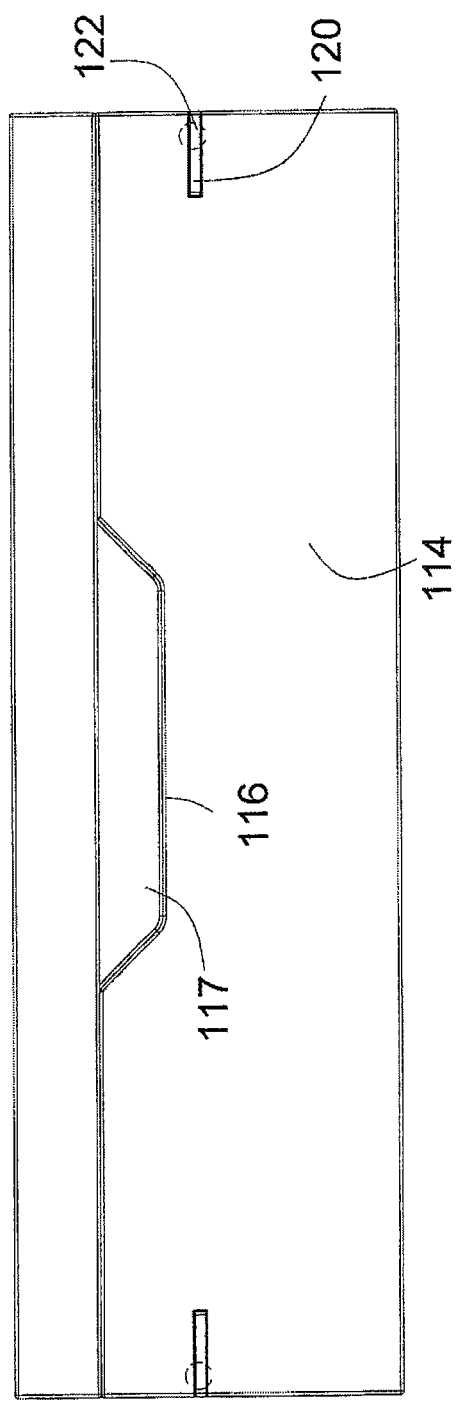
FIG. 12 is a front view of the embodiment of FIG. 4.

As can be seen from the front plan view of FIG. 12, cover 118 is sealed shut against enclosure bottom 150. Recessed notch 116 is defined by a recessed back wall 117. The purpose of recessed back wall 117 is to close the gap in front sidewall 114 created by the cut-out of recessed notch 116. This may be seen clearly in FIG. 5. In order to open cover 118, a user inserts his or her fingers into recessed notch 116, as far back as back wall 117 allows, and lifts cover 118 upward from below.

Figure 13:
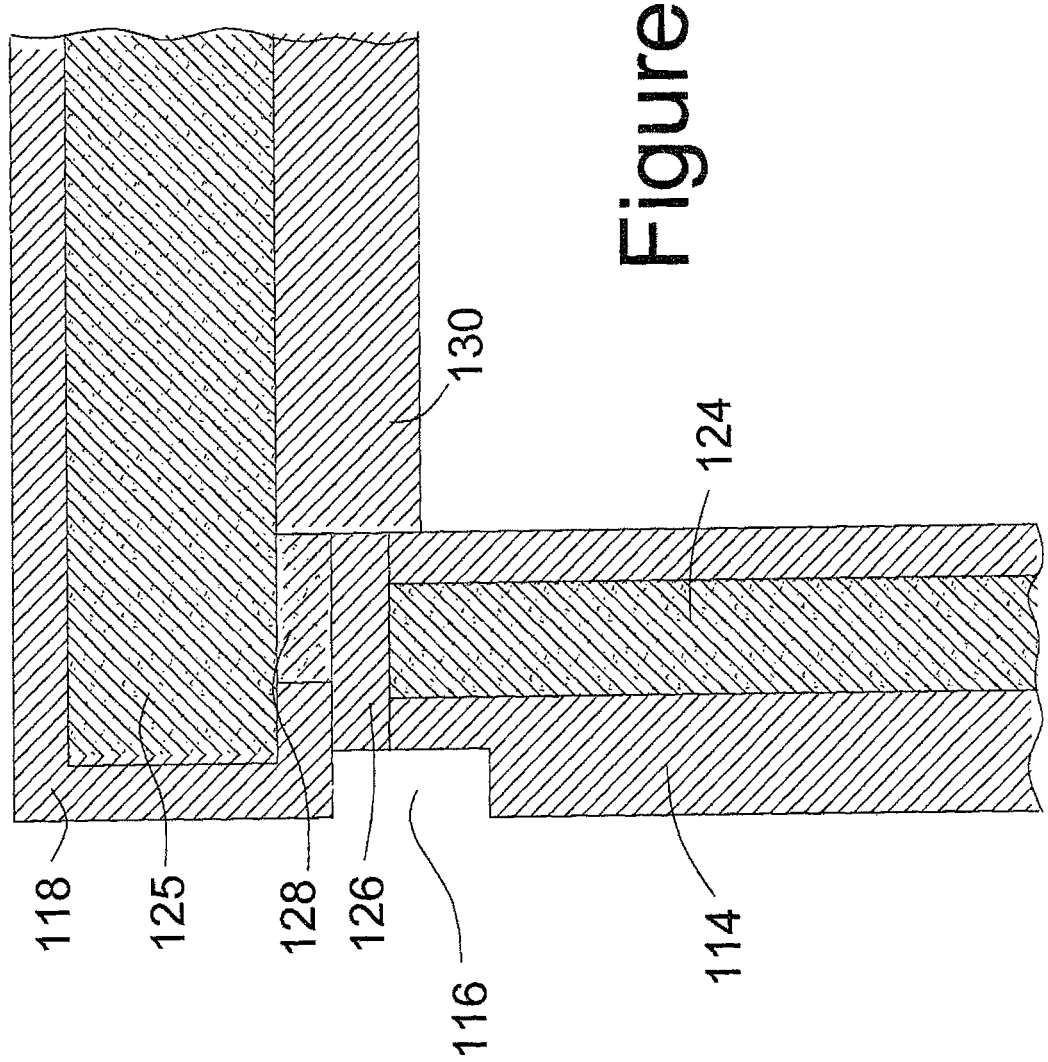
FIG. 13 is a cross-sectioned view of the finger grip portion of the top of the front sidewall of the embodiment of FIG. 4.

FIG. 13 presents a cross-sectioned view of recessed notch 116 in front sidewall 114, where front sidewall 114 and soft rubber 126, that covers its top surface, meet. Cover 118 and inlaid foam layer 128 seal the contents of enclosure 110.

Figure 14:
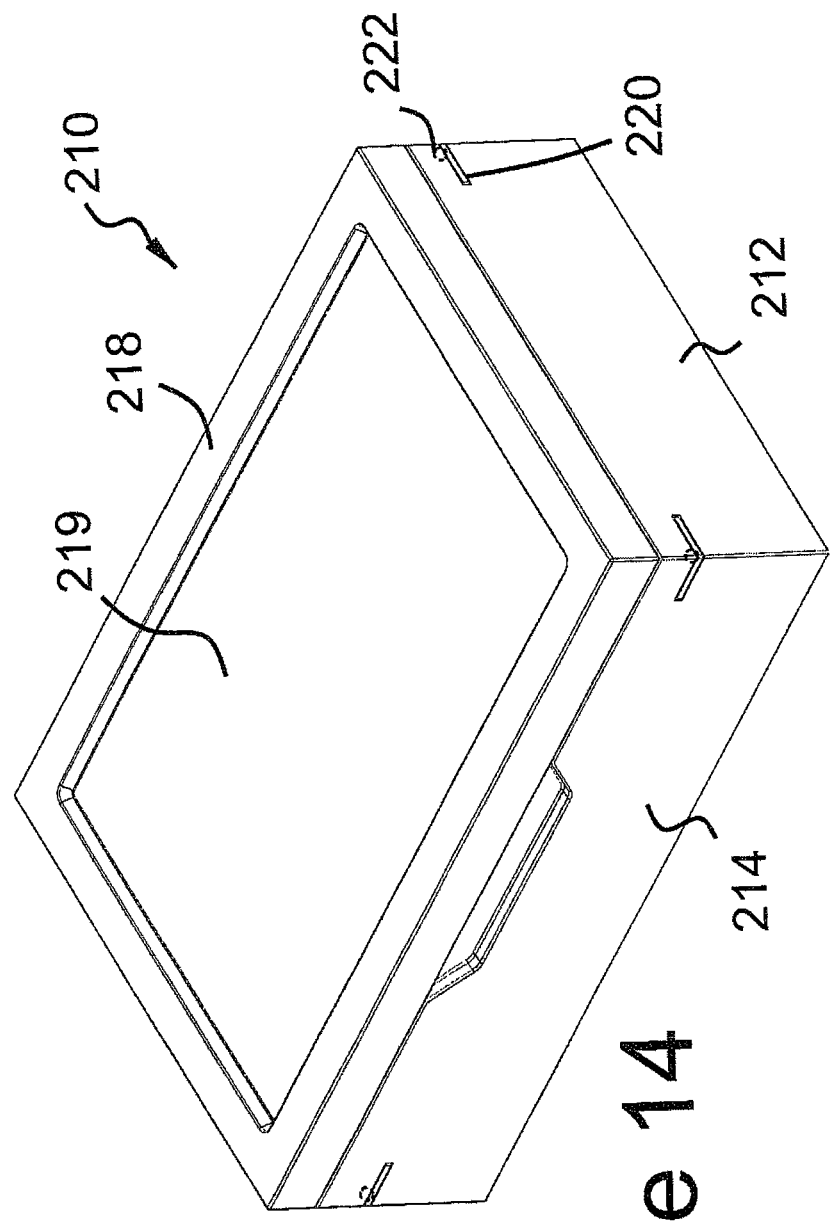
FIG. 14 is a perspective view of another alternative embodiment, wherein the cover in that embodiment comprises a clear glass window.

In yet another alternative embodiment, as shown in FIG. 14, cover 218 of enclosure 210 includes a glass window 219 to allow the cellular or mobile wireless devices 8 to be viewed inside the enclosure for visual observation of any incoming calls and caller identification information.

Figure 15:
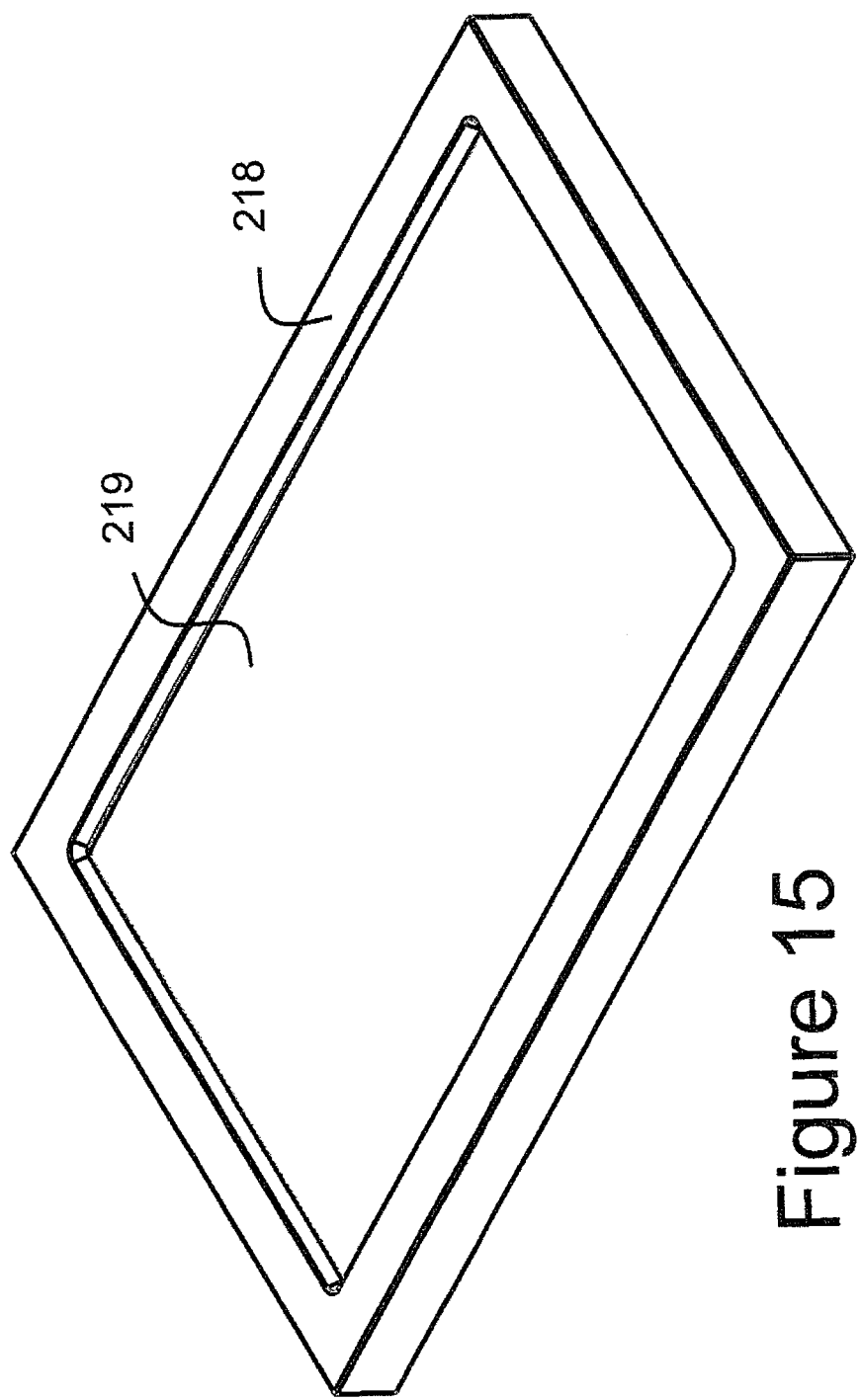
FIG. 15 is a perspective of the cover of the embodiment of FIG. 14.

Cover 218, as shown in FIG. 15, may include a glass window 219 and may be separated from enclosure 110 entirely, or cover 218 may be connected to enclosure 210 by a hinge.

Figure 16:
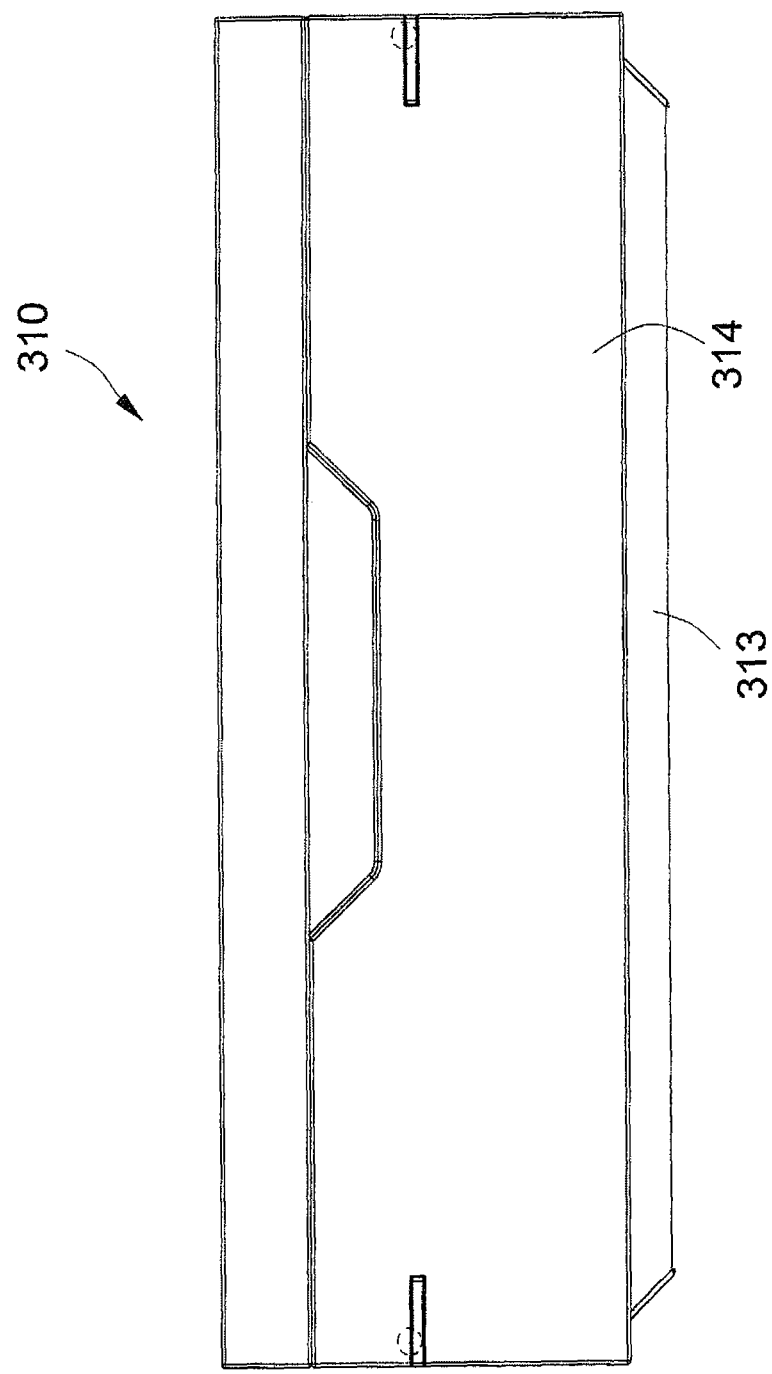
FIG. 16 is a front view of yet another alternative embodiment of the present invention which comprises a covered box with a trapezoidal base.

In an alternative embodiment, as shown in FIG. 16, the exterior of enclosure 310 features a base 313 with trapezoidal walls that extends below the length of sidewalls 312, 314 and supports enclosure 310.

Figure 17:
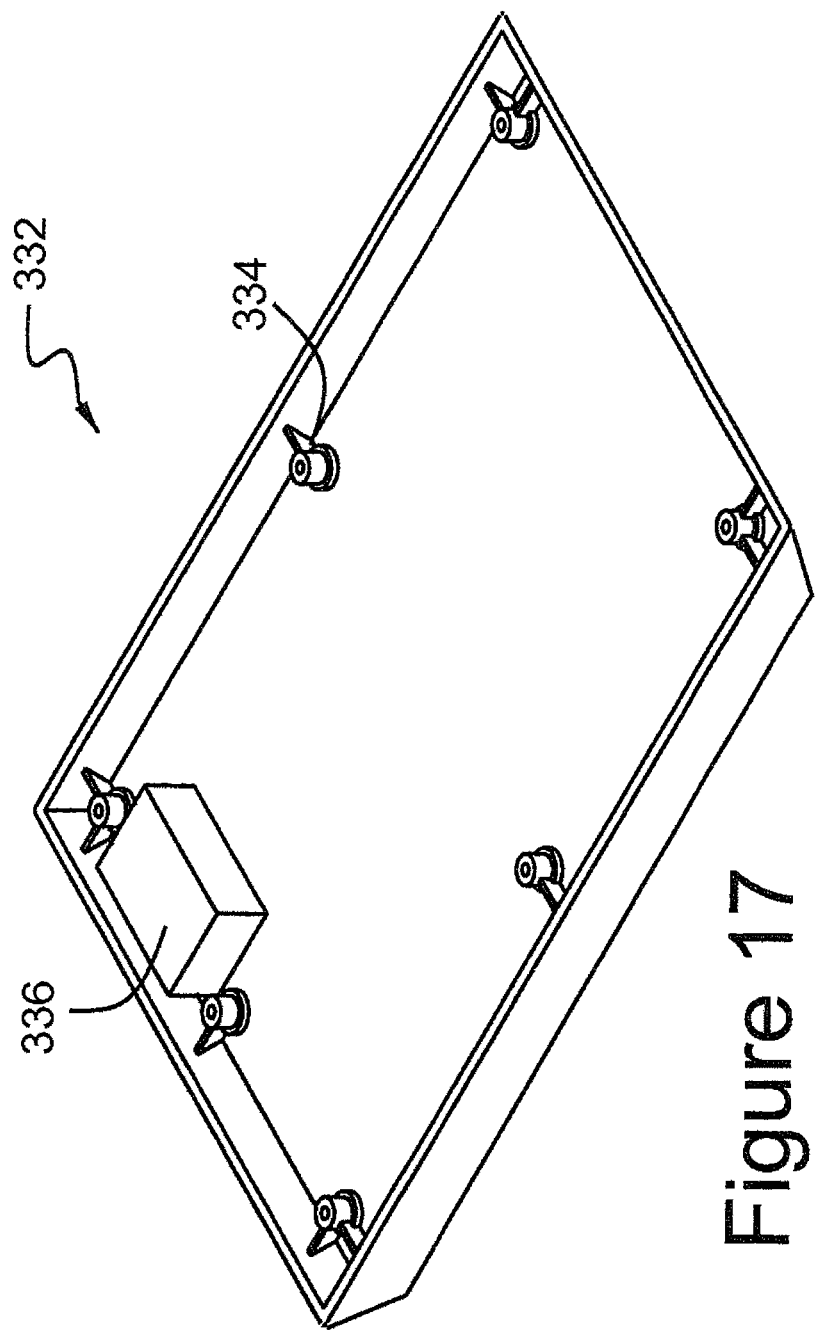
FIG. 17 is a perspective of the base of the embodiment of FIG. 16, illustrating the angled sides and trapezoidal shape of said base.

In this alternative embodiment, base 332, which comprises screw holders 334 and battery compartment 336 as is shown in FIG. 17, contains foundational walls that angle inwardly in order to form the trapezoidal shape of the base 332.

Figure 18:
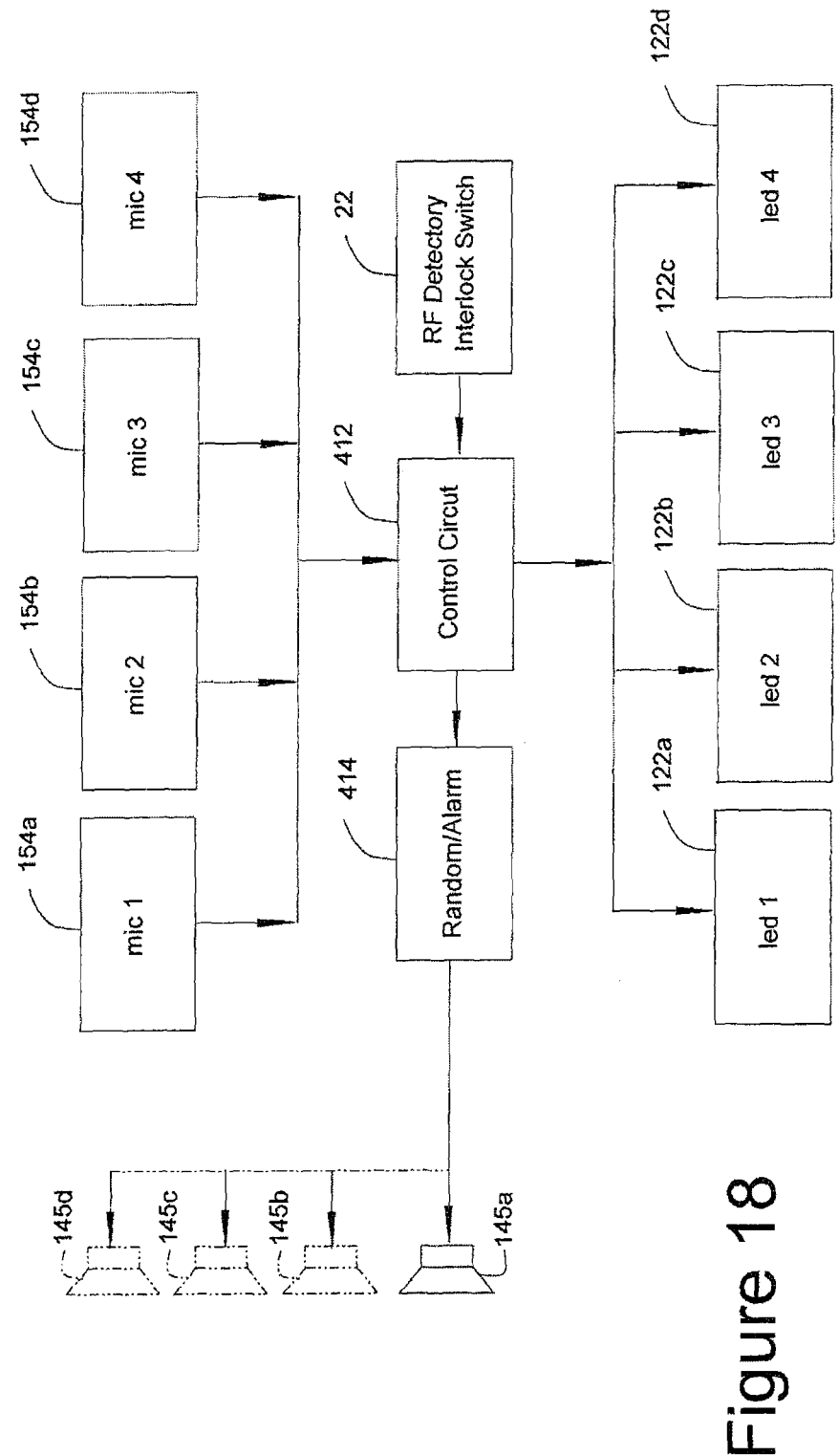
FIG. 18 is a block diagram illustrating electronic components of an embodiment of the inventive enclosure.

A block diagram 410 of an electronic circuit for the enclosure 410 of the present invention is illustrated in FIG. 18. Control circuit 112 comprises a microprocessor and associated memory and is coupled to a digital to analog circuit 414. Control circuit 412 controls the output of a sound signal generator cooperating with the digital to analog circuit 414 which outputs the desired audible blocking signal whether it be white noise, pink noise or another noise. This signal is output to speaker 145.

In accordance with an alternative embodiment of the invention, instead of a single speaker, a plurality of speakers 145b-d are each associated with and positioned proximate to a respective one of the cradles 152. The use of multiple speakers ensures that all smartphones in the cradles receive an adequate volume of interfering noise, without producing excessive wasted noise. This arrangement reduces total noise, due to the proximity of the speakers and their respective smartphones. A proximity detector may enable the speaker only if a smartphone is in the cradle. These measures reduce leaked noise and allow the increase of noise actually received by the smartphones. If desired, antinoise technology may be used to reduce the effect of the jamming signal on the ability of the circuitry to detect smartphone ringing or vibration. Alternatively, a single speaker central to all the cradles may also be employed.

Most importantly, when an individual speaker 145 a-d is associated with each of the cradles 152 a-d, the noise level may be reduced insofar as the audio noise jamming signal needs only travel a short distance to its respective cellular telephone. Absent such a provision, a relatively high volume of blocking noise would be required from a single speaker 145, especially since reflected sound is minimized by the sound absorbing properties of the inside of the box, which may be even more substantial, in the event that a sound absorbing liner is included as is illustrated in phantom lines in FIG. 5. This means that more effective blocking of conversation audio entering enclosure 110 may be achieved without undesirable levels of noise outside of enclosure 110.

Returning to the description of FIG. 18, a plurality of microphones 154a-d is provided, respectively, for cradles 152a-d. Each of the microphones detects the occurrence of ringing or vibration from the smartphone resting in its respective cradle 152a-d. The system may also be provided with any number of switches 22 which can trigger control circuit 412 to generate an alarm signal upon the detection of the opening of the cover of enclosure 110, or the detection of an RF transmitted signal indicating that a cellular telephone is transmitting a signal, or other alarm condition. The alarm may be sounded by control circuit 412 by causing circuit 414 to emit an alarm sound and causing all of the light emitting diodes 122a-d to blink.

During operation of the system, control circuit 412 causes the emission of the desired noise blocking signal by speakers 145a-d. At the same time, microphones 154a-d are being periodically monitored, for example at a rate of 10 times per second, for ringing sounds or vibration which can both be detected by microphones 154a-d. When control circuit 412 determines that one of the microphones is being activated by its respective smartphone, that information is sent to the respective light emitting diode 122 which begins to blink.

It is contemplated, in accordance with the invention, that users will put their smartphones in the cradle closest to their seating position, for example around a round table, and thus will know which LED is associated with their smartphone because the LED closest to them will be the one that is blinking when it is their smartphone that is receiving an incoming call. Sticky notes or other markings may also be used in the proximity of the light emitting diode.

Although the mobile phone/PDA security masking enclosure and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed:

1. A security noise masking container for securing and isolating a plurality of communications devices, each of said devices comprising a microphone for detecting sounds in the surrounding environment, comprising:
    (a) a container, comprising a sound absorbing material, said container having a plurality of supports, each of said supports being configured to receive a respective one of said devices and limiting the position of its respective device;
    (b) a container closure configured and dimensioned to close the container, the container closure comprising a closure sound absorbing material, a closure acoustic isolation volume between closure walls containing said closure sound absorbing material; and
    (c) an acoustic noise generator arranged within the interior of the container, said acoustic noise generator comprising a plurality of individual noise generators, each of which individual noise generators generates noise only when the presence of a device in its respective support is detected, said acoustic nose generator having a frequency and amplitude distribution suitable to acoustically mask the human voice and generating noise of an amplitude sufficient to drive circuitry receiving sounds detected by the microphone substantially toward saturation, whereby when
        (i) a device with a microphone for detecting sounds from the surrounding environment is placed within the container,
        (ii) the container closure is closed and
        (iii) the acoustic noise generator is activated, the effectiveness of the device to receive useful sounds from the surrounding environment is substantially reduced.

2. A security noise masking container as in claim 1 wherein said container comprises an inner wall and an outer wall and a sound absorbing material positioned between said walls, and the interior surfaces of the container are covered with a sound absorbing material.

3. A security noise masking container as in claim 1 wherein the inner wall and the outer wall have no direct rigid mechanical linkage between them.

4. A security noise masking container as in claim 1 wherein the acoustic noise generator includes a volume control.

5. A security noise masking container as in claim 1 wherein the acoustic noise masking generator generates different noise signals from time to time.

6. A security noise masking container as in claim 1 wherein the acoustic noise masking circuitry includes a power on indicator.

7. A security noise masking container as in claim 1 wherein the container comprises an inner wall and an outer wall comprising a composite material comprising a material selected from the group consisting of volcanic ash and banana fiber, and equivalents thereof.

8. A security noise masking container as in claim 1 wherein the container is provided with a caller ID module which uses a wireless protocol for exchanging data connected to an indicator mounted on the exterior of said container to display incoming call numbers received by devices within the container.

9. A security noise masking container as in claim 1 wherein said container and said container closure comprise a solid sound isolation material.

10. A security noise masking container as in claim 1, wherein said container and said container closure comprise walls comprising two or more materials selected from the group consisting of fiberglass, non-woody vegetable fibers, and volcanic ash.

11. A security noise masking container as in claim 1, wherein said container provides at least 40 decibels of sound isolation.

12. A security noise masking container as in claim 1, wherein said acoustic noise generator generates a non-recreatable noise that effective prevents sound processing from determining a pattern and way to filter out the noise.

13. A security noise masking container as in claim 1 wherein the container is provided with an indicator mounted on the exterior of said container wherein said indicator comprises a lighting device in a predetermined position corresponding to the position of a device being activated by an incoming communication.

14. A security noise masking container for securing and isolating a plurality of devices, said devices being smart phones, each of said devices comprising a microphone for detecting sounds in the surrounding environment and generating an audio signal, and circuitry for receiving and amplifying said audio signal, comprising:
(a) a container, comprising a sound absorbing material, said container having a plurality of supports, each of said supports being configured to receive a respective one of said devices and limiting the position of its respective device;
(b) a container closure configured and dimensioned to close the container, the container closure comprising a closure sound absorbing material, the closure acoustic isolation volume between closure walls containing said closure sound absorbing material; and
(c) an acoustic noise generator arranged within the interior of the container, said acoustic noise generator generating noise of an amplitude sufficient to drive said circuitry receiving sounds detected by the microphone substantially toward saturation, whereby when
(i) a device with a microphone for detecting sounds from the surrounding environment is placed within the container,
(ii) the container closure is closed and
(iii) the acoustic noise masking circuitry is activated, the effectiveness of the device to receive useful sounds from the surrounding environment is substantially reduced, wherein the interior of said security masking container defines a plurality of receiving portions each of said receiving portions adapted to receive a respective device to be isolated wherein the acoustic noise generator comprises a plurality of sound sources, each of said sound sources being proximate a respective receiving portion on the interior of said security masking container, whereby each of said sound sources is positioned to efficiently transmit acoustic energy to a respective one of said devices positioned in its respective receiving portion.

15. A security noise masking container for securing and isolating devices comprising a microphone for detecting sounds in the surrounding environment, comprising:
(a) a container, comprising:
(i) an outer container wall;
(ii) an inner container wall, said outer container wall and said inner container wall defining an acoustic isolation volume between said outer container wall and said inner container wall, said container having a plurality of supports, each of said supports being configured to receive a respective one of said devices and limiting the position of its respective device;
(b) a sound absorbing material, the acoustic isolation volume between the walls containing said sound absorbing material;
(c) a container closure configured and dimensioned to close for the container, the container closure comprising:
(i) an outer container closure wall;
(ii) an inner container closure wall, said outer container closure wall and said inner container closure wall defining a closure acoustic isolation volume between said outer container closure wall and said inner container closure wall,
(d) a closure sound absorbing material, the closure acoustic isolation volume between the closure walls containing said closure sound absorbing material,
(e) a window for viewing the interior of the container;
(f) an isolating member in the interior of the container, the isolating member being arranged to isolate a portion of the interior of the container;
(g) acoustic noise masking circuitry arranged within the isolated portion of the interior of the container; and
(h) an RF sensor is located inside the container and connected to an indicator to show if a device within the container is transmitting an RF signal, whereby when
(i) a device with a microphone for detecting sounds from the surrounding environment is placed within the container,
(ii) the container closure is closed and
(iii) the acoustic noise masking circuitry is activated, the effectiveness of the device to receive useful sounds from the surrounding environment is substantially reduced.

16. A security noise masking container for securing and isolating a plurality of devices, each of which devices comprises a microphone for detecting sound and for communicating said sound, comprising:

(a) a container, comprising a sound absorbing material;
(b) a container closure configured and dimensioned to close the container, the container closure comprising a closure sound absorbing material;
(c) a plurality of device receiving structures;
(d) a plurality of acoustic noise generators arranged within the interior of the container, each of said acoustic noise generators being associated with a respective device receiving structure and generating noise of an amplitude sufficient to substantially degrade the effectiveness of the device to receive useful sounds from the surrounding environment, wherein each of said acoustic noise generators is positioned proximate its respective device receiving structure, said device receiving structures being disposed in the interior of said security masking container, and wherein said device receiving structures comprise mechanical abutments to limit the position of a respective device and insure its respective microphone is likely to be proximate to its respective acoustic noise generator.

17. A security noise masking container as in claim 16 wherein said container comprises an inner wall and an outer wall and a sound absorbing material positioned between said walls.

18. A security noise masking container as in claim 17 wherein the container comprises an inner wall and an outer wall comprising a composite material comprising a material selected from the group consisting of volcanic ash and banana fiber, and equivalents thereof.

19. A security noise masking container as in claim 16 wherein said device receiving structures comprise mechanical abutments to guide the position of a respective device and insure the respective microphone of the device is likely to be proximate to its respective acoustic noise generator, and further comprising a plurality of detectors detecting the presence of a device, each of which individual noise generators generates noise only when the presence of a device in its respective support is detected.

20. A security noise masking container for securing and isolating devices, each of said devices comprising a microphone for detecting sounds in the surrounding environment, comprising:
(a) a container comprising a sound absorbing material;
(b) a container closure configured and dimensioned to close the container, the container closure comprising a closure sound absorbing material, a closure acoustic isolation volume between closure walls containing said closure sound absorbing material;
(c) an acoustic noise generator arranged within the interior of the container, said acoustic noise generator having a frequency and amplitude distribution suitable to acoustically mask the human voice and generating noise of an amplitude sufficient to drive circuitry receiving sounds detected by the microphone substantially into saturation, whereby when
  (i) a device with a microphone for detecting sounds from the surrounding environment is placed within the container,
  (ii) the container closure is closed and
  (iii) the acoustic noise generator is activated, the effectiveness of the device to receive useful sounds from the surrounding environment is substantially reduced; and
(d) a caller ID module which uses a wireless protocol for exchanging data to connect to an indicator mounted on the exterior of said container to display incoming call numbers received by devices within the container.

21. A security noise masking container for securing and isolating devices, each of said devices comprising a microphone for detecting sounds in the surrounding environment, comprising:
(a) a container comprising a sound absorbing material;
(b) a container closure configured and dimensioned to close the container, the container closure comprising a closure sound absorbing material, a closure acoustic isolation volume between closure walls containing said closure sound absorbing material; and
(c) an acoustic noise generator arranged within the interior of the container, said acoustic noise generator having a frequency and amplitude distribution suitable to acoustically mask the human voice and generating noise of an amplitude sufficient to drive circuitry receiving sounds detected by the microphone substantially into saturation, said acoustic noise generator generating a non-recreatable noise that effective prevents sound processing from determining a pattern and way to filter out the noise, whereby when
  (i) a device with a microphone for detecting sounds from the surrounding environment is placed within the container,
  (ii) the container closure is closed and
  (iii) the acoustic noise generator is activated, the effectiveness of the device to receive useful sounds from the surrounding environment is substantially reduced.

* * * * *

UNITED STATES PATENT AND TRADEMARK OFFICE
CERTIFICATE OF CORRECTION

| | | |
|---|---|---|
| PATENT NO. | : 9,336,768 B2 | Page 1 of 1 |
| APPLICATION NO. | : 13/952556 | |
| DATED | : May 10, 2016 | |
| INVENTOR(S) | : Soufan et al. | |

It is certified that error appears in the above-identified patent and that said Letters Patent is hereby corrected as shown below:

Title Page, item (72), Seventh inventor's name: Anthony H. Handal, Westport, CT (US);

It should read -- Anthony N. Handal, Westport, CT (US).

Signed and Sealed this
Ninth Day of August, 2016

Michelle K. Lee
*Director of the United States Patent and Trademark Office*